Oct. 19, 1937.  E. A. ROCKWELL  2,096,438
AUTOMATICALLY CONTROLLED FREEWHEEL DEVICE
Filed Aug. 16, 1933  2 Sheets-Sheet 1
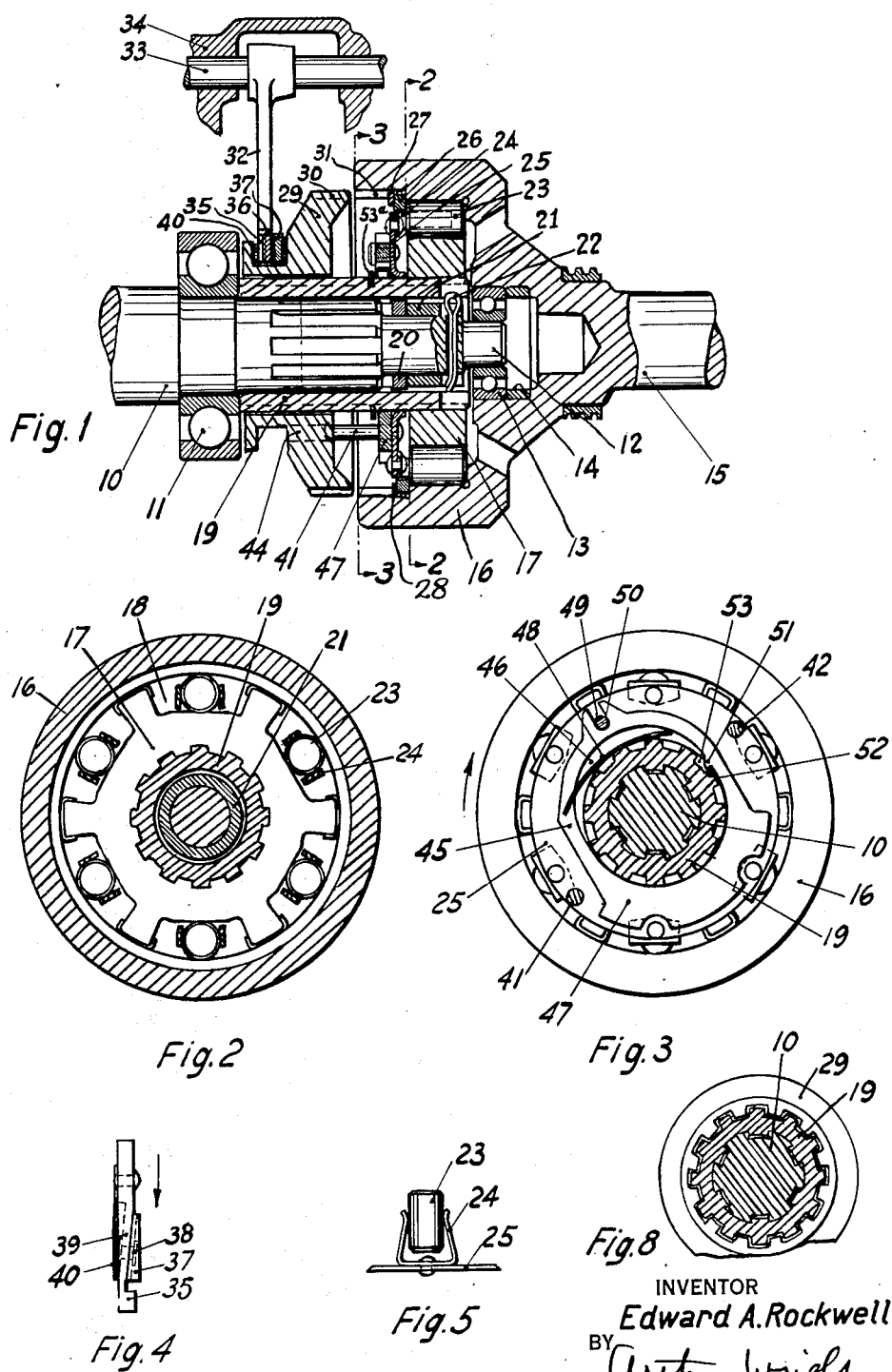
INVENTOR
Edward A. Rockwell.
BY
ATTORNEY Oct. 19, 1937.  E. A. ROCKWELL  2,096,438

AUTOMATICALLY CONTROLLED FREEWHEEL DEVICE

Filed Aug. 16, 1933  2 Sheets-Sheet 2

INVENTOR
Edward A. Rockwell.
BY Arthur Wright
ATTORNEY

Patented Oct. 19, 1937

2,096,438

UNITED STATES PATENT OFFICE 2,096,438

AUTOMATICALLY CONTROLLED FREE-WHEEL DEVICE

Edward A. Rockwell, Chicago, Ill., assignor, by mesne assignments, to General Auto Parts Corporation, a corporation of Delaware Application August 16, 1933, Serial No. 685,409

14 Claims. (Cl. 192—48)

My invention relates to free wheeling devices which are adapted to be applied to automotive vehicles of all kinds.

The object of my invention is to provide a free wheeling device which is so arranged as to provide for forward and reverse drive and which is capable of free wheeling between the forward and rearward driving positions, but which is also capable of being manually locked so as to eliminate the free wheeling action, which is capable of positive actuation during the operation thereof. Further objects of my invention will appear from the detailed description of the same hereinafter.

While my invention is capable of embodiment in many different forms, for the purpose of illustration I have shown only two forms of the same in the accompanying drawings, in which—

Fig. 1 is a vertical section showing one form of the invention;

Fig. 2 is a detail section of the free wheeling mechanism taken on line 2—2 of Fig. 1;

Fig. 3 is a left side elevation showing details of the control mechanism partly in section taken on line 3—3 of Fig. 1;

Fig. 4 is a development of the friction control finger;

Fig. 5 is a detail of the roller guide;

Fig. 8 illustrates the loosely splined relation between the clutch member and its supporting sleeve.

Figure 6:
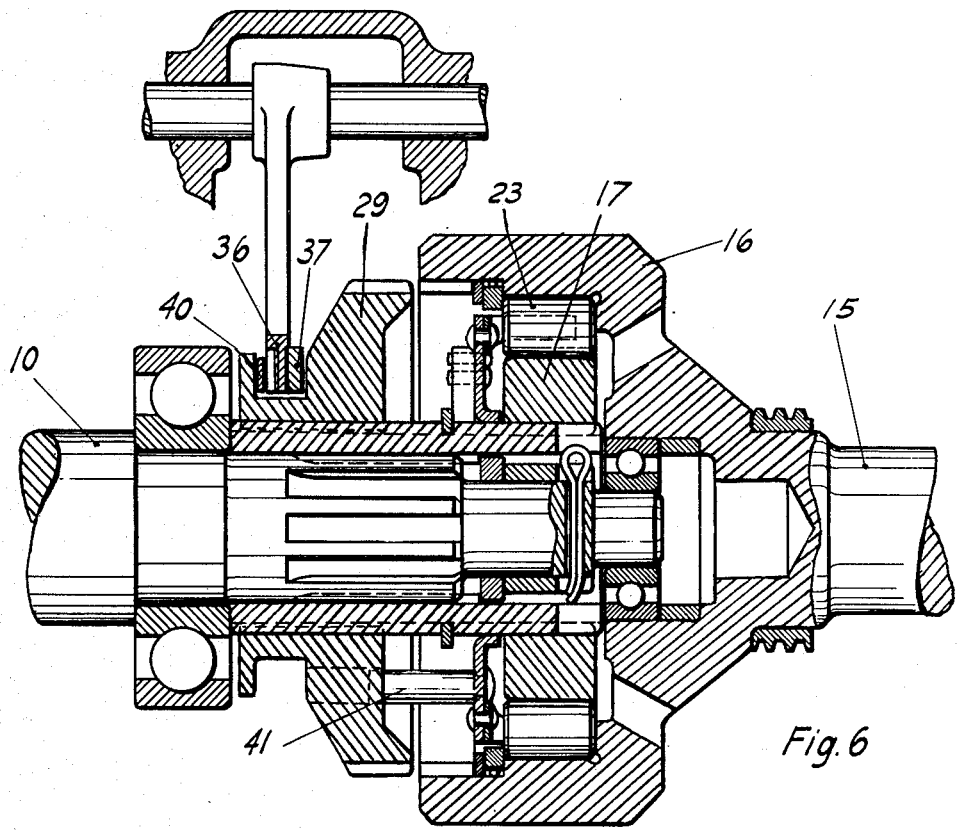
Fig. 6 is a vertical section of an alternative form of the invention.

Referring to Fig. 1, I have provided a driving shaft 10, supported on the usual bearings 11. An extension 12 of the shaft 10 is supported in a pilot bearing 13 in a recess 14 of a driven shaft 15. Formed integrally with the driven shaft 15 is a cup-shaped member 16 which constitutes the outer or driven ring of the free wheel drive. An inner or driving member 17, having tapered peripheral recesses 18 with flat intervening surfaces, is splined to a sleeve 19 which in turn is splined to the driving shaft 10. A ring 20, backed by a bushing 21 fastened by a cotter pin 22 through the shaft 10, restrains the sleeve 19 from endwise motion on the shaft 10. Each tapered recess 18 of the driving member 17 contains a roller 23, guided by a spring clip 24, as shown in Fig. 5. The clips 24 are riveted to a disk 25 which is rotatably supported on the splined sleeve 19. The rollers 23 are retained in place by a ring 26 backed by a second split ring 27 expanded into an internal groove 28 in the cup member 16. A clutch member 29 is loosely splined to the sleeve 19 so as to be slidable and to allow a slight rotation thereon for the reasons pointed out hereinafter. External teeth 30 on the member 29 are adapted to engage internal teeth 31 cut in the end of the cup member 16. A manually shiftable arm 32, fixed to a rod 33 slidable in a cover member 34 of any desired type, has a lower yoke portion 35 engaging a groove 36 in the clutch member 29. A wedge 37 in a tapered recess of the yoke 35, is retained therein and allowed a limited sliding motion by a pin 38 in a slot 39 in the yoke 35. A leaf spring 40, fastened to the yoke 35, tends to urge the wedge 37 into frictional engagement with the side of the groove 36. A pair of driving pins 41 and 42, fixed in the clip disk 25, are slidable in holes 44 through the clutch member 29. An eccentrically weighted ring 45, having an enlongated hole 46, as shown in Fig. 3, is loosely supported on the sleeve 19, the weighted side 47 being normally urged inward by a leaf spring 48 fixed at one end in the ring 45 the other end thereof resting in the hole 46. A slot 49 in the ring 45 opposite the weighted side 47, engages a pin 50 fixed in the clip disk 25. A tooth 51 on the inner surface of the ring 45, is adapted to engage an edge 52 of one spline groove 53 of the sleeve 19 and thus act as a fulcrum. A split retainer ring 53a, Fig. 1, restrains the weight ring 45 from moving sidewise on the sleeve 19.

The operation of this form of my invention is as follows: The driving shaft 10, being revolved by the motor in a forward or clockwise direction, as shown in Fig. 3, the driving member 17 carries the rollers 23 around, and with them the clip disk 25, as the parts 10, 19 and 29 are keyed together and as the pins 41 and 42 extend from the part 29 to the cage 25. The loose splined connection between 19 and 29 permits this initial movement of the roller cage 25 notwithstanding the fact that the cage is connected by the pins 41 and 42 to the part 29. Initially, before the swinging of the weight 47, the splines on the clutch member 29 at the upper part of Fig. 8 will float between the splines on the sleeve 19. This is due to the spring 48 initially holding the weight 47 in its unswung position. For this purpose the spring 48 is made relatively strong. The weight 47, due to the centrifugal force, tends to swing relatively counter-clockwise on the tooth 51 as a fulcrum engaging the spline edge 52, the said centrifugal force acting against the force of the spring 48. This motion is transmitted through the pin 50 to the clip disk 25, urging the rollers 23 into their forward drive tapers and causing a positive forward drive. This is possible, due to the loosely splined relation of the parts 29 and 19. For example, at that time the splines on the clutch member 29 at the upper part of Fig. 8 will approach towards the left the splines on the sleeve 19. Should the speed of the driven member 16 exceed that of the driving member 17, the unit will free wheel as the cup-shaped member 16 will roll the rollers 23 off of their forward driving tapers.

When the shaft 10 is driven in the reverse direction, the same centrifugal force on the weighted ring 47 causes the latter to act in the same direction as before noted against the spring 48, thus tending to keep the rollers 23 shifted in the direction of the forward drive tapers and thus preventing their engagement. To overcome this tendency and give a reverse drive, the wedge 37, acted upon by friction in an upward direction, see Fig. 4, slides up its taper and places an increased frictional resistance on the clutch member 29. This resistance causes the clutch member 29 to shift back slightly in its loosely splined relation to the sleeve 19, shifting the clip disk 25 through the drive pins 41 and 42, overcoming the force of the weight 47, and forcing the rollers 23 into the reverse driving tapers, thus giving a reverse drive.

To sum up, the tendency of the weight 47 is to hold the rollers in forward driving and free wheeling positions at all times. In reverse the wedging friction on the clutch member 29 overcomes the weight 47 and shifts the rollers into reverse driving position. The lost motion between the member 29 and the sleeve 19 permits the necessary relative rotation of such member 29 and the clip disk 25 connected thereto with respect to the shaft 10 and the sleeve 19, both in moving the rollers in their forward driving and reverse driving positions. The spring 48 thus tends to hold the weight 47 and the connected clip disk 25 in the initial or intermediate position.

To give a manual lockout, the clutch member 29 is slid by the shifter arm 32 until its external teeth 30 mesh with the internal teeth 31 in the driven cup 16.

Figure 7:
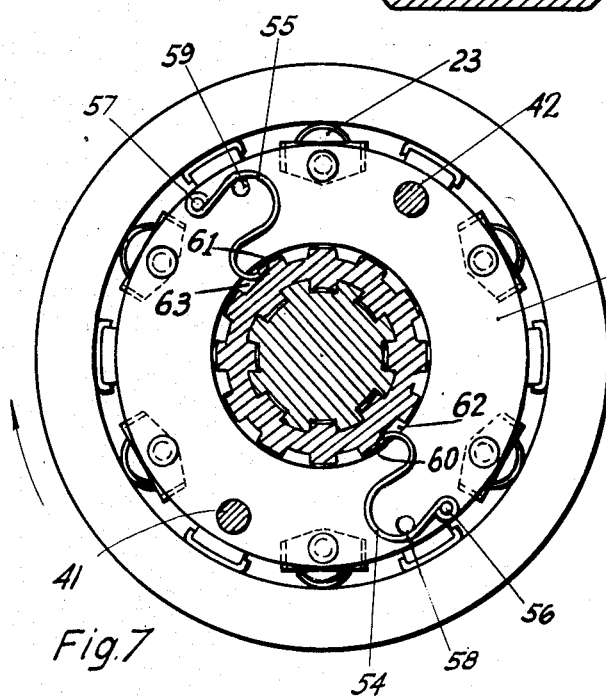
Fig. 7 is a left side elevation showing details of the control mechanism of Fig. 6.
Figure 9:
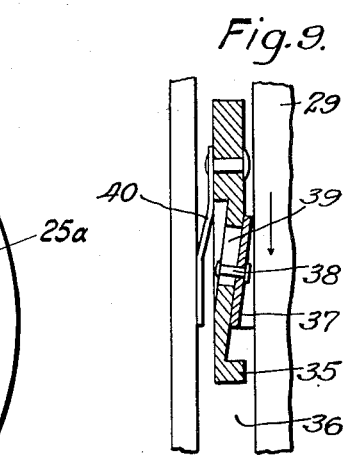
Fig. 9 is a vertical section of the parts shown in Fig. 4.

The construction shown in Fig. 6 is identical with that shown in Fig. 1, except that the weighted ring 45 is replaced by curved springs 54 and 55, see Fig. 7, retained on pins 56 and 57 fixed in the clip disk 25a. Pins 58 and 59, also fixed in the disk 25a, urge the springs 54 and 55 against edges 60 and 61 of splined grooves 62 and 63, thus urging the disk 25a in a counter-clockwise direction relative to the driver 17 and normally holding the rollers in forward driving position. In reverse, the added frictional lag of the clutch member 29, due to the wedge 37, see Fig. 4, overcomes the springs 54 and 55 and urges the rollers 23 into the reverse driving tapers, in the manner previously described.

While I have described my invention above in detail I wish it to be understood that many changes may be made therein without departing from the spirit of the same.

I claim:

1. A free wheeling device comprising a driving member, a driven member, a set of rollers adapted to couple the driving member to the driven member, one of said members having tapered pockets for said rollers, a spring means for normally forcing the rollers into the forward driving tapers thereof, said pockets being so arranged that free wheeling will take place when the driven member over-runs the driving member, and means for controlling the operation of the free wheeling device, said means comprising cooperating devices, one of which is retardably connected to the driving member and means for retarding the same upon the reverse drive of the driving member so as to throw the said rollers into reverse driving position of the driven member, said retarding means being adapted to overcome the force of said spring means.

2. A free wheeling device comprising a driving member, a driven member, a set of rollers adapted to couple the driving member to the driven member, one of said members having tapered pockets for said rollers, said pockets being so arranged that free wheeling will take place when the driven member over-runs the driving member, and means for controlling the operation of the free wheeling device, said means comprising cooperating devices adapted to move the rollers into their forward drive tapers on the forward drive, one of which is retardably connected to the driving member and means comprising a wedging friction device brought into engaging action by the reverse drive for retarding the same upon the reverse drive of the driving member, so as to throw the said rollers into reverse driving tapers.

3. A free wheeling device comprising a driving member, a driven member, a set of rollers adapted to couple the driving member to the driven member, one of said members having tapered pockets for said rollers, a centrifugal weight adapted to force the rollers into the forward driving tapers, said pockets being so arranged that free wheeling will take place when the driven member over-runs the driving member, and means actuated by the rotation and superior to the force of the centrifugal weight at its full speed for controlling the operation of the centrifugal weight.

4. A free wheeling device comprising a driving member, a driven member, a set of rollers adapted to couple the driving member to the driven member, one of said members having tapered pockets for said rollers, a centrifugal weight adapted to force the rollers into the forward driving tapers, said pockets being so arranged that free wheeling will take place when the driven member over-runs the driving member, and means for controlling the operation of the free wheeling device, comprising means actuated by the rotation to counteract the centrifugal force of the centrifugal weight at its full speed.

5. A free wheeling device comprising a driving member, a driven member, a set of rollers adapted to couple the driving member to the driven member, one of said members having tapered pockets for said rollers, a centrifugal weight fulcrumed on the periphery of the driving member, adapted to force the rollers into the forward driving tapers, said pockets being so arranged that free wheeling will take place when the driven member over-runs the driving member, and means superior to the force of the centrifugal weight at its full speed for controlling the operation of the centrifugal weight.

6. A free wheeling device comprising a driving member, a driven member, a set of rollers adapted to couple the driving member to the driven member, one of said members having tapered pockets for said rollers, a centrifugal weight fulcrumed on the periphery of the driving member, adapted to force the rollers into the forward driving tapers, said pockets being so arranged that free wheeling will take place when the driven member over-runs the driving member, and means for controlling the operation of the free wheeling device, comprising means to counteract the centrifugal force of the centrifugal weight at its full speed.

7. A free wheeling device comprising a driving member, a driven member, a set of rollers adapted to couple the driving member to the driven member, one of said members having tapered pockets for said rollers, a centrifugal weight fulcrumed in a splined recess of the driving member, adapted to force the rollers into the forward driving tapers, said pockets being so arranged that free wheeling will take place when the driven member over-runs the driving member, and means for controlling the operation of the centrifugal weight.

8. A free wheeling device comprising a driving member, a driven member, a set of rollers adapted to couple the driving member to the driven member, one of said members having tapered pockets for said rollers, a centrifugal weight fulcrumed in a splined recess of the driving member, adapted to force the rollers into the forward driving tapers, said pockets being so arranged that free wheeling will take place when the driven member over-runs the driving member, and means for controlling the operation of the free wheeling device, comprising means to counteract the effect of the centrifugal weight.

9. A free wheeling device comprising a driving member, a driven member, a set of rollers adapted to couple the driving member to the driven member, one of said members having tapered pockets for said rollers, a spring means normally forcing the rollers into the driving tapers, said pockets being so arranged that free wheeling will take place when the driven member over-runs the driving member, and means for controlling the operation of the free wheeling device, comprising means to counteract the effect of said spring means and so as to lock the driving to the driven member on the reverse drive including a reverse drive friction device.

10. A free wheeling device comprising a driving member, a driven member, a set of rollers adapted to couple the driving member to the driven member, one of said members having tapered pockets for said rollers, a spring means normally forcing the rollers into the driving tapers, said pockets being so arranged that free wheeling will take place when the driven member over-runs the driving member, and means for controlling the operation of the free wheeling device, comprising means to counteract the effect of said spring means on the reverse drive including a reverse drive wedging friction device.

11. A free wheeling device comprising a driving member, a driven member, a set of rollers adapted to couple the driving member to the driven member, one of said members having tapered pockets for said rollers, a spring means normally forcing the rollers into the driving tapers, reacting against a recess in the driving member, said pockets being so arranged that free wheeling will take place when the driven member over-runs the driving member, and means actuated by the reverse drive for controlling the operation of the free wheeling device, comprising means to counteract the effect of said spring means and so as to lock the driving to the driven member on the reverse drive.

12. A free wheeling device comprising a driving member, a driven member, a set of rollers adapted to couple the driving member to the driven member, one of said members having tapered pockets for said rollers, a spring means normally forcing the rollers into the driving tapers, reacting against a spline recess in the driving member, said pockets being so arranged that free wheeling will take place when the driven member over-runs the driving member, and means actuated by the reverse drive for controlling the operation of the free wheeling device, comprising means to counteract the effect of said spring means and so as to lock the driving to the driven member on the reverse drive.

13. A free wheeling device comprising a driving member, a driven member, a set of rollers adapted to couple the driving member to the driven member, one of said members having tapered pockets for said rollers, said pockets being so arranged that free wheeling will take place when the driven member over-runs the driving member, a retainer ring for the rollers, a spring controlling device for normally forcing the rollers into the driving tapers, and means for throwing the free wheeling device out of operation, said means comprising a rotatable member coupled to the retainer ring and a manual lock-out device having a reverse-drive actuated friction retarding means for retarding the rotatable member so as to thereby overcome the action of said spring controlling device.

14. A free wheeling device comprising a driving member, a driven member, a set of rollers adapted to couple the driving member to the driven member, one of said members having tapered pockets for said rollers, said pockets being so arranged that free wheeling will take place when the driven member over-runs the driving member, a retainer ring for the rollers, a spring controlling device for normally forcing the rollers into the driving tapers, and means for throwing the free wheeling device out of operation, said means comprising a rotatable member splined to the driving member, one of the members having a splined recess, the rotatable member being coupled to the retainer ring and a manual lock-out device having a reverse-drive actuated friction means for retarding the rotatable member so as to thereby overcome the action of said spring controlling device, said spring controlling device comprising a centrifugal weight fulcrumed in the spline recess.

EDWARD A. ROCKWELL.